US008612551B2

(12) United States Patent
Fawcett

(10) Patent No.: US 8,612,551 B2
(45) Date of Patent: *Dec. 17, 2013

(54) METHOD AND SYSTEM FOR IDENTIFYING AND OBTAINING COMPUTER SOFTWARE FROM A REMOTE COMPUTER

(75) Inventor: Phillip E. Fawcett, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 153 days.

This patent is subject to a terminal disclaimer.

(21) Appl. No.: 13/084,212

(22) Filed: Apr. 11, 2011

(65) Prior Publication Data

US 2011/0185351 A1    Jul. 28, 2011

Related U.S. Application Data

(60) Continuation of application No. 11/441,530, filed on May 26, 2006, now Pat. No. 7,925,718, which is a division of application No. 09/948,821, filed on Sep. 7, 2001, now abandoned, which is a continuation of application No. 09/558,957, filed on Apr. 25, 2000, now Pat. No. 6,327,617, which is a continuation of application No. 09/149,993, filed on Sep. 9, 1998, now Pat. No. 6,073,214, which is a continuation of application No. 08/562,929, filed on Nov. 27, 1995, now Pat. No. 5,845,077.

(51) Int. Cl.
*G06F 15/16* (2006.01)
*G06F 12/00* (2006.01)

(52) U.S. Cl.
USPC .......................................................... 709/219

(58) Field of Classification Search
USPC ......................................... 709/217–221, 250
See application file for complete search history.

(56) References Cited

U.S. PATENT DOCUMENTS

| | | | |
|---|---|---|---|
| 4,558,413 A | 12/1985 | Schmidt et al. |
| 4,796,181 A | 1/1989 | Wiedemer |
| 4,953,209 A | 8/1990 | Ryder, Sr. et al. |
| 4,982,430 A | 1/1991 | Frezza et al. |
| 5,003,591 A | 3/1991 | Kauffman et al. |

(Continued)

FOREIGN PATENT DOCUMENTS

EP    0677809 A1    10/1995

OTHER PUBLICATIONS

A Brief Overview of the Viola Engine, and its Applications, http://www.viola.org/violaIntro.html, 13 pages, Aug. 16, 1994.
Branwyn, "Getting Started," Mosaic Quick Tour, Ventana Press, Inc., Chapel Hill, NC, pp. 11-26, 1994.
Branwyn, Mosaic Quick Tour, Ventana Press, Inc., Chapel Hill, NC, pp. 104-112, 1994.

(Continued)

*Primary Examiner* — Zarni Maung
(74) *Attorney, Agent, or Firm* — Merchant & Gould P.C.

(57) ABSTRACT

Creators of computer software provide the most up-to-date versions of their computer software on an update service. A user who has purchased computer software calls the update service on a periodic basis. The update service automatically inventories the user computer to determine what computer software may be out-of-date, and/or need maintenance updates. If so desired by the user, the update service computer automatically downloads and installs computer software to the user computer. By making periodic calls to the update service, the user always has the most up-to-date computer software immediately available. The update service may also alert the user to new products (i.e. including new help files, etc.), and new and enhanced versions of existing products, which can be purchased electronically by a user from the update service.

20 Claims, 5 Drawing Sheets

(56) References Cited

U.S. PATENT DOCUMENTS

| | | | |
|---|---|---|---|
| 5,047,928 | A | 9/1991 | Wiedemer |
| 5,142,680 | A | 8/1992 | Ottman et al. |
| 5,155,484 | A | 10/1992 | Chambers, IV |
| 5,155,680 | A | 10/1992 | Wiedemer |
| 5,155,847 | A | 10/1992 | Kirouac et al. |
| 5,247,683 | A | 9/1993 | Holmes et al. |
| 5,267,171 | A | 11/1993 | Suzuki et al. |
| 5,337,360 | A | 8/1994 | Fischer |
| 5,367,621 | A | 11/1994 | Cohen et al. |
| 5,367,686 | A | 11/1994 | Fisher et al. |
| 5,388,211 | A | 2/1995 | Hornbuckle |
| 5,390,247 | A | 2/1995 | Fischer |
| 5,421,009 | A | 5/1995 | Platt |
| 5,473,772 | A | 12/1995 | Halliwell et al. |
| 5,493,682 | A | 2/1996 | Tyra et al. |
| 5,495,411 | A | 2/1996 | Ananda |
| 5,496,177 | A | 3/1996 | Collia et al. |
| 5,528,490 | A | 6/1996 | Hill |
| 5,548,645 | A | 8/1996 | Ananda |
| 5,555,416 | A | 9/1996 | Owens et al. |
| 5,586,304 | A | 12/1996 | Stupek, Jr. et al. |
| 5,586,322 | A | 12/1996 | Beck et al. |
| 5,634,056 | A | 5/1997 | Casotto |
| 5,638,446 | A | 6/1997 | Rubin |
| 5,654,746 | A | 8/1997 | McMullan, Jr. et al. |
| 5,654,901 | A | 8/1997 | Boman |
| 5,678,002 | A | 10/1997 | Fawcett et al. |
| 5,689,711 | A | 11/1997 | Bardasz et al. |
| 5,694,546 | A | 12/1997 | Reisman |
| 5,701,451 | A | 12/1997 | Rogers et al. |
| 5,706,502 | A | 1/1998 | Foley et al. |
| 5,710,918 | A | 1/1998 | Lagarde et al. |
| 5,717,930 | A | 2/1998 | Imai et al. |
| 5,721,824 | A | 2/1998 | Taylor |
| 5,742,829 | A | 4/1998 | Davis et al. |
| 5,748,960 | A | 5/1998 | Fischer |
| 5,764,992 | A | 6/1998 | Kullick et al. |
| 5,838,906 | A | 11/1998 | Doyle et al. |
| 5,845,077 | A * | 12/1998 | Fawcett ............... 709/221 |
| 5,845,090 | A | 12/1998 | Collins, III et al. |
| 5,860,012 | A | 1/1999 | Luu |
| 5,909,581 | A | 6/1999 | Park |
| 5,913,040 | A | 6/1999 | Rakavy et al. |
| 5,999,740 | A | 12/1999 | Rowley |
| 6,016,520 | A | 1/2000 | Facq et al. |
| 6,073,214 | A * | 6/2000 | Fawcett ............... 711/133 |
| 6,125,388 | A | 9/2000 | Reisman |
| 6,327,617 | B1 * | 12/2001 | Fawcett ............... 709/219 |
| 6,332,217 | B1 | 12/2001 | Hastings |
| 6,529,784 | B1 | 3/2003 | Cantos et al. |
| 6,557,054 | B2 | 4/2003 | Reisman |
| 6,611,862 | B2 | 8/2003 | Reisman |
| 6,658,464 | B2 | 12/2003 | Reisman |
| 6,769,009 | B1 | 7/2004 | Reisman |
| 7,925,718 | B2 * | 4/2011 | Fawcett ............... 709/219 |
| 2002/0016956 | A1 | 2/2002 | Fawcett |
| 2004/0015833 | A1 | 1/2004 | Dellarocas et al. |
| 2006/0155737 | A1 | 7/2006 | Fawcett |

OTHER PUBLICATIONS

Dagenais et al., LUDE, A Distributed Software Library, http://www.cs.ualbert.caloperationsIDOC/lude/lude2.html (Oct. 1995), 9 pgs.
Darrow et al., "Microsoft Debuts Low-Cost NT 3.5," Computer Reseller News, No. 596, pp. 1-2, Sep. 19, 1994.
Extensibility and Mini Applications, http://www.viola.orglbook/chp13.html, Extensibility, Ch. 13, 10 pages, prior to Dec. 12, 1996.
Flavin et al., Management of distributed applications in large networks, 1988 IEEE publication, pp. 232-241.
Lichty, America Online for Macintosh Tour Guide, 2nd Ed., Version 2.5, pp. 123-163 (1994).
Lichty, America Online's Internet; Windows Ed., pp. 135-178 (1994).
Mercury Operator's Log: Oct. 26-Dec. 1, 1994, http://www.usc.edu/dept/raiders/logs/alpha-log-941202-941224.html, Dec. 24, 1994.
Moore, "SMS Debut Draws Crowds, Queries; Corporate Role Remains Uncertain," Computerworld, vol. 28, No. 38, p. 14, Sep. 19, 1994.
Mori et al., "Superdistribution: The Concept and the Architecture", The Transaction of the IEICE, vol. E73, No. 7, pp. 1133-1146 (Jul. 1990).
Pei Wei, O'Reilly & Associates, "Extensibility in WWW Browsers," Stanford Computer Forum WWW Workshop, 3 pages, Sep. 20-21, 1994.
Pei Wei, O'Reilly & Associates, "WWW Browsers: Extensibility Issues," Stanford Computer Forum WWW Workshop, 1 page, Sep. 20-21, 1994.
Raggett, HyperText Markup Language Specification Version 3.0, pp. 1-190, Mar. 28, 1995, 175 pgs.
Rozenbilt, "O, A & M Capabilities for Switching Software Management" IEEE Global Telecommunications Conference, 1993, pp. 357-361.
Schroeder et al., "Windows 95 Rushes the Net: Netscape, Microsoft, Others Release New Browsers," PC Week, vol. 12, No. 34, p. 11, Aug. 28, 1995.
Smalley, "Hermes Nears Finish Line; Bloodhound will be Part of Summer Debut," PC Week, vol. 11, No. 19, p. 31, May 16, 1994.
The Viola Home Page, http://www.viola.orgi, 3 pgs., prior to Dec. 12, 1996.
U.S. Appl. No. 11/441,530, Amendment and Response filed Nov. 12, 2010, 7 pgs.
U.S. Appl. No. 11/441,530, Amendment and Response filed Feb. 1, 2010, 9 pgs.
U.S. Appl. No. 11/441,530, Amendment and Response filed Jun. 25, 2010, 7 pgs.
U.S. Appl. No. 11/441,530, Notice of Allowance mailed Dec. 2, 2010, 4 pgs.
U.S. Appl. No. 11/441,530, Office Action mailed Oct. 30, 2009, 6 pgs.
U.S. Appl. No. 11/441,530, Office Action mailed Mar. 25, 2010, 6 pgs.
U.S. Appl. No. 11/441,530, Office Action mailed Jul. 12, 2010, 5 pgs.
Viola in a Nutshell, http://www.viola.orglbook/preface.html, 3 pages, prior to Dec. 12, 1996.
Viola WWW Features List, http://www.viola.org/vwFeatures.html, 1 page, prior to Dec. 12, 1996.
Williams, "Internet Component Download," Microsoft Interactive Development, 49-52, Summer, 1996.
Wingfield, "Netscape Inks Pact with Sun, Macromedia," Info World, vol. 17, No. 22, p. 16, May 29, 1995.
U.S. Appl. No. 08/562,929, Non-Final Office Action mailed Jul. 1, 1997 (9 pages).
U.S. Appl. No. 08/562,929, Amendment and Response filed Aug. 25, 1997 (9 pages).
U.S. Appl. No 08/562,929, Final Office Action mailed Dec. 5, 1997 (11 pages).
U.S. Appl. No. 08/562,929, Final Office Action mailed May 22, 1998 (12 pages).
U.S. Appl. No. 08/562,929, Amendment and Response filed Jul. 29, 1998, 3 pgs.
U.S. Appl. No. 08/562,929, Notice of Allowance mailed Aug. 3, 1998 (4 pages).
U.S. Appl. No. 09/149,993, Non-Final Office Action mailed Feb. 18, 1999 (11 pages).
U.S. Appl. No. 09/149,993, Amendment and Response filed May 21, 1999 (20 pages).
U.S. Appl. No. 09/149,993, Final Office Action mailed Aug. 16, 1999 (11 pages).
U.S. Appl. No. 09/149,993, Notice of Allowance mailed Jan. 18, 2000 (4 pages).
U.S. Appl. No. 09/558,957, Non-Final Office Action mailed Feb. 20, 2001 (13 pages).
U.S. Appl. No. 09/558,957, Amendment and Response filed May 25, 2001 (18 pages).
U.S. Appl. No. 09/558,957, Notice of Allowance mailed Jun. 8, 2001 (4 pages).

(56) References Cited

OTHER PUBLICATIONS

U.S. Appl. No. 09/558,957, Supplemental Notice of Allowance mailed Jun. 12, 2001 (2 pages).

U.S. Appl. No. 09/558,957, Supplemental Notice of Allowance mailed Aug. 8, 2001 (2 pages).

* cited by examiner

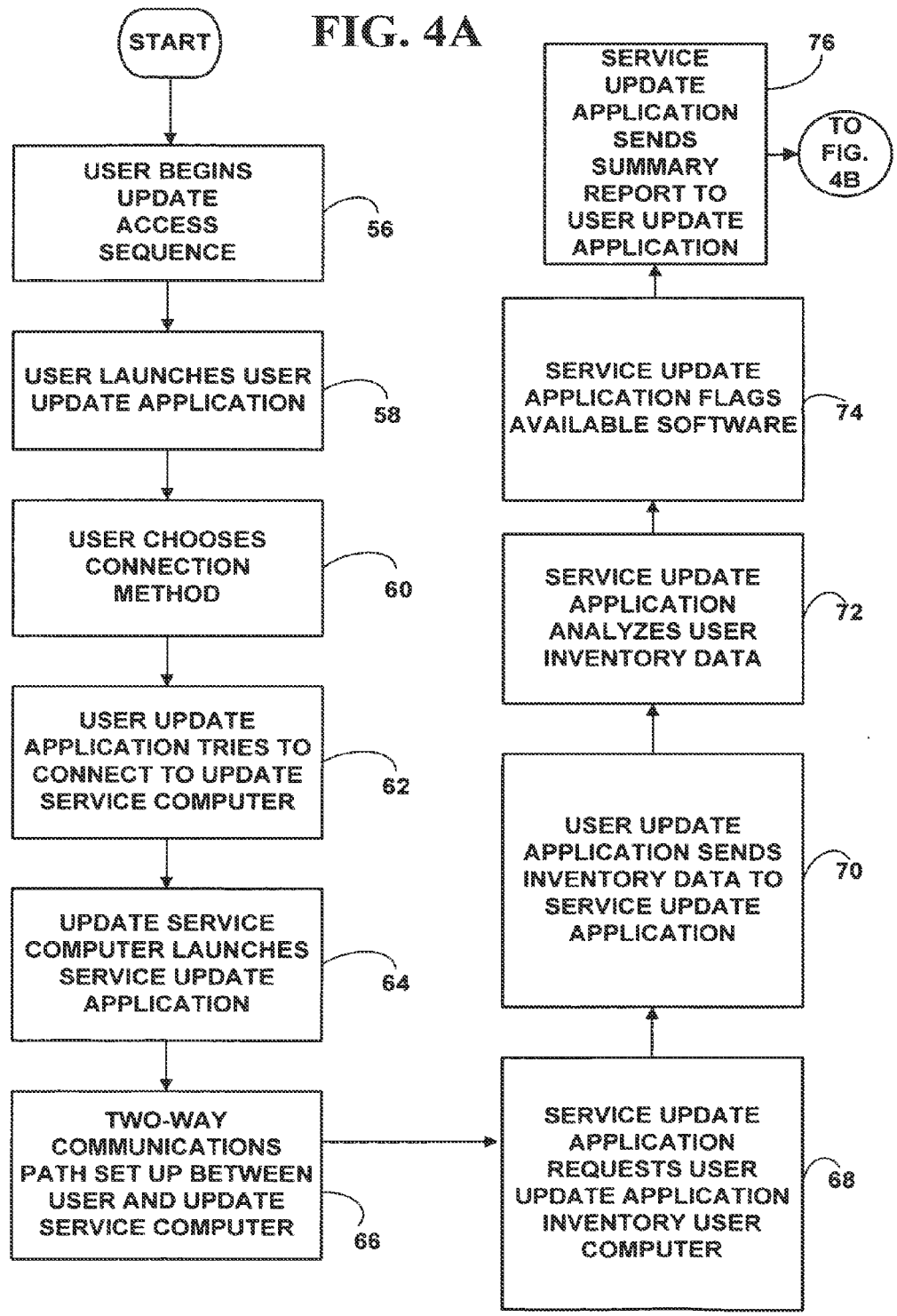

METHOD AND SYSTEM FOR IDENTIFYING AND OBTAINING COMPUTER SOFTWARE FROM A REMOTE COMPUTER

CROSS-REFERENCE TO RELATED APPLICATIONS

This present application is a continuation of and claims priority to U.S. patent application Ser. No. 11/441,530, entitled "METHOD AND SYSTEM FOR IDENTIFYING AND OBTAINING COMPUTER SOFTWARE FROM A REMOTE COMPUTER", filed May 26, 2006, which will issue as U.S. Pat. No. 7,925,718 and which is a divisional application of U.S. patent application Ser. No. 09/948,821, filed on Sep. 7, 2001, entitled "METHOD AND SYSTEM FOR IDENTIFYING AND OBTAINING COMPUTER SOFTWARE FROM A REMOTE COMPUTER, which has since been abandoned and which is a continuation of U.S. patent application Ser. No. 09/558,957, filed Apr. 25, 2000, entitled "METHOD AND SYSTEM FOR IDENTIFYING AND OBTAINING COMPUTER SOFTWARE FROM A REMOTE COMPUTER", which has since issued as U.S. Pat. No. 6,327,617 and which is a continuation of U.S. patent application Ser. No. 09/149,993, filed Sep. 9, 1998 entitled "METHOD AND SYSTEM FOR IDENTIFYING AND OBTAINING COMPUTER SOFTWARE FROM A REMOTE COMPUTER" which has since issued as U.S. Pat. No. 6,073,214 which is a continuation of U.S. patent application Ser. No. 08/562,929, filed Nov. 27, 1995, entitled "METHOD AND SYSTEM FOR IDENTIFYING AND OBTAINING COMPUTER SOFTWARE FROM A REMOTE COMPUTER", which has since issued as U.S. Pat. No. 5,845,077. The present application claims priority to all of the above-identified patent applications, and all of the above-identified patent applications are hereby incorporated by reference in their entirety as if set forth herein in full.

BACKGROUND AND SUMMARY

The continual and rapid development of computers, computer software and related technology has revealed many problems with the typical distribution channels for computer software. For example, computer software, the coded instructions that control a computer's operation, are constantly and incrementally being upgraded and improved. The computer hardware and operating system environment on which the computer software is used is continually being changed, which requires additional changes in the computer software (e.g. new device drivers, new operating system calls, etc.).

A computer software developer will typically release an initial version of a software product. Thereafter, as new and improved computers and peripherals are developed, the software product will commonly be upgraded so as to take full advantage of the increased capabilities of the hardware. In addition, a software developer, to remain competitive, will often upgrade the software product to provide new features and functionality.

With the ever increasing pace of advancement in computer related technologies, software developers compete to be the first to offer a new feature or upgrade. As a result, sometimes software products are made available to the public with unknown errors or defects. Similarly, software products that work as intended on a particular computer with a particular configuration, may fail when installed on a different computer having a different configuration (e.g. different hardware, peripherals, operating systems, etc.). Software developers frequently provide fixes for their software products to correct defects that were undetected or unanticipated at the time the software product was released. Fixes are also provided to allow the software product to function correctly on a new computer or with a different operating system environment.

However, it is often difficult for software developers to make upgrades and fixes available to users. This difficulty not only deprives the user of access to the most reliable and up-to-date software products, it can result in lost sales to the software developer and can damage the goodwill and the development of a long term relationship with a customer by releasing a flawed or deficient software product.

Commonly, mass distribution of commercial software products is accomplished by copying the software product onto storage media (e.g. CD-ROMs, floppy disks, magnetic tapes, etc.). To take advantage of economies of scale, typically a large number of copies of the software product are made during the manufacture of a particular software product. Then, the storage media containing the software product is provided to distributors and retailers for sale to users. However, given the rapid pace of software development, this manner of distribution is frequently insufficient. For example, it is not uncommon that defects are detected and fixes created shortly after a software product is introduced to the public. However, the software products that remain in the distribution chain contain the defect without the fix. This situation is frustrating for users who subsequently purchase the software product that is already obsolete (i.e. because of the defects).

Software can also be distributed over electronic bulletin board systems, the Internet, etc. In such systems, a user connects to the bulletin board and then selects and downloads desired software. Such systems allow for rapid updating of software by simply supplying a new updated version of the software to the bulletin board. However, such systems also require a degree of user sophistication and technical expertise in the selection, downloading and installation of the new software. Moreover, such systems do not provide a user that has already obtained a software product with a simple, automatic way of learning of or obtaining upgrades or fixes for that product. The software provider may also have updated help files and other help utilities about which a user would have no way of knowing.

In accordance with an illustrated embodiment of the present invention, many of the problems associated with obtaining computer software are overcome. A user, with a user computer is allowed to access (e.g. with a modem, an Internet connection, etc.) an update service at a remote location on which is stored a variety of computer software. When a user accesses the remote update service, an update service computer conducts an automatic inventory of the computer software on the user computer. The data collected from the inventory of the user computer software is then used to make comparisons to database entries from a database on the update service computer. The database entries contain information about computer software available on the update service computer. The comparison is conducted to identify software available from the remote update service that might be appropriate for installation on the user computer (i.e. new computer software, new versions of existing computer software, patches or fixes for existing computer software, new help files, etc.). After the comparison is completed, the update service computer makes the computer software stored at the remote update service computer available to the user.

In one aspect of the invention, available computer software can be downloaded from the remote update service computer and installed immediately on the user computer. Another aspect of the invention allows the update service computer to contact the user computer at a later, more convenient time, re-establish two-way communications, then download and install available computer software on the user computer. If a delayed download is requested, the user will provide access information (e.g. phone number, network address, a file of commands to execute to logon the user computer, etc.) to the update service computer which allows the remote update service computer to re-connect to the user computer. The transfer may use an encryption scheme to permit safe transfer of the software to the user computer.

In yet another aspect of the invention, the system will allow a user to purchase the available computer software electronically. The user, for example, provides credit card information, debit card information, an account number to bill, etc. to the update service computer. Secure transaction technology and/or digital signatures are used to safeguard the payment information. After verifying the payment information, the update service computer permits transfer of the computer software.

The update service has several advantages. A user is automatically provided with information about the available versions of computer software as a result of the inventory conducted by the update center computer. If the version of the computer software on the user computer has defects that are known and have been corrected, the user is alerted to this fact and is offered an up-to-date version of the computer software. The user is also alerted to the availability of new computer software, or enhanced versions of existing computer software, and can purchase them electronically. In either case, the most up-to-date versions of computer software are available for downloading to users.

The available versions of the computer software can also be automatically installed on the user computer. Since it is no longer necessary for the user to install the computer software, the incidence of user related installation problems is greatly reduced. It is also not necessary for the user to obtain or save any storage media since the computer software is downloaded directly to the user computer. If the computer software installed on the user computer ever gets corrupted, the user can call the update service (e.g. for some limited number of iterations) and download a new (and up-to-date) copy of the computer software.

In addition to providing benefits for the user, the illustrated embodiment of the invention provides benefits to the developers of the software. The developers of the computer software save support, distribution, and advertising costs. A user who calls the update service automatically obtains up-to-date versions of available computer software, and may never encounter defects which would have been encountered using an earlier, defective version of the computer software. As a result, a user will require less support from the developers of the software, be more satisfied, and be more willing to purchase future versions of computer software. Since the computer software is downloaded to the user computer, the developers of the computer software may save distribution costs as fewer versions of the computer software have to be copied to storage media and distributed. In addition, since the user is also alerted when new computer software, and/or new versions of existing computer software are available, the software developers may also save advertising costs.

The foregoing and other features and advantages of the illustrated embodiment of the present invention will be more readily apparent from the following detailed description, which proceeds with reference to the accompanying drawings.

BRIEF DESCRIPTION OF THE DRAWINGS

FIGS. 4A-4B are a flow chart showing an illustrative sequence which is followed when a user calls the update service.

DETAILED DESCRIPTION

Figure 1:
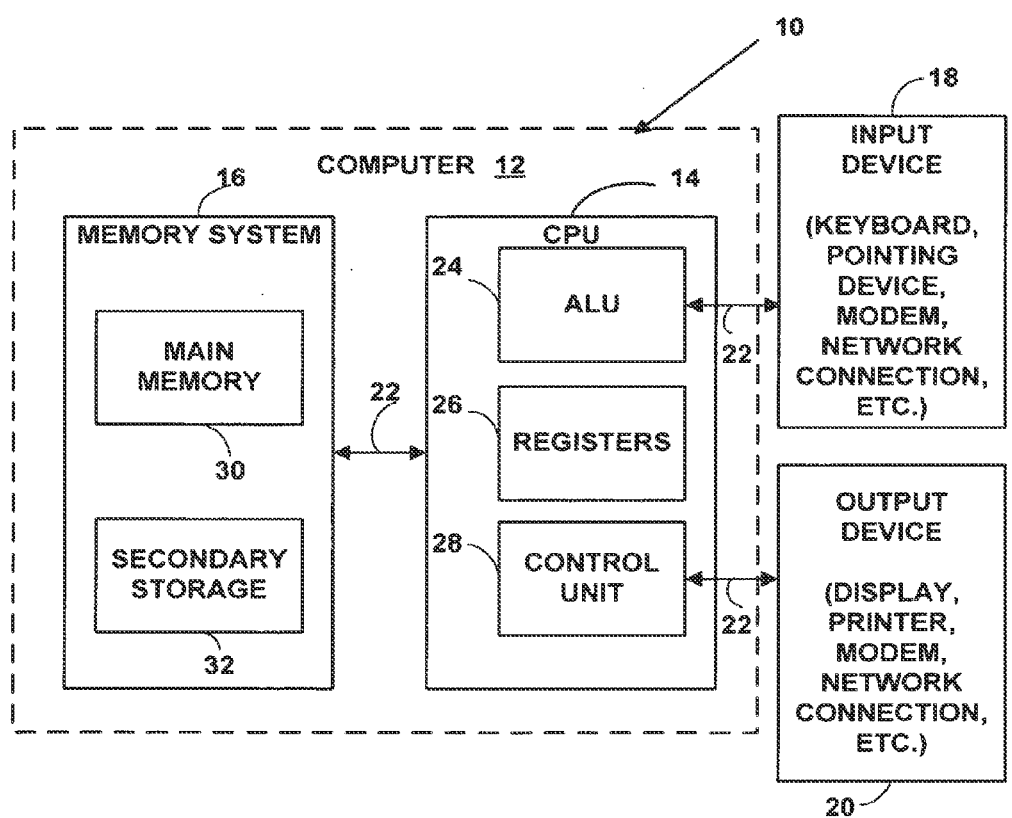
FIG. 1 is a block diagram of a computer system used to implement an illustrated embodiment of the present invention.

Referring to FIG. 1, an operating environment for the illustrated embodiment of the present invention is a computer system 10 with a computer 12 that comprises at least one high speed processing unit (CPU) 14, in conjunction with a memory system 16, an input device 18, and an output device 20. These elements are interconnected by a bus structure 22.

The illustrated CPU 14 is of familiar design and includes an ALU 24 for performing computations, a collection of registers 26 for temporary storage of data and instructions, and a control unit 28 for controlling operation of the system 10. Any of a variety of processors, including those from Digital Equipment, Sun, MIPS, IBM, Motorola, NEC, Intel, Cyrix, AMD, Nexgen and others are equally preferred for CPU 14. Although shown with one CPU 14, computer system 10 may alternatively include multiple processing units.

The memory system 16 includes main memory 30 and secondary storage 32. Illustrated main memory 30 is high speed random access memory (RAM) and read only memory (ROM). Main memory 30 can include any additional or alternative high speed memory device or memory circuitry. Secondary storage 32 takes the form of long term storage, such as ROM, optical or magnetic disks, organic memory or any other volatile or non-volatile mass storage system. Those skilled in the art will recognize that memory 16 can comprise a variety and/or combination of alternative components.

The input and output devices 18, 20 are also familiar. The input device 18 can comprise a keyboard, mouse, pointing device, sound device (e.g. a microphone, etc.), or any other device providing input to the computer system 10. The output device 20 can comprise a display, a printer, a sound device (e.g. a speaker, etc.), or other device providing output to the computer system 10. The input/output devices 18, 20 can also include network connections, modems, or other devices used for communications with other computer systems or devices.

As is familiar to those skilled in the art, the computer system 10 further includes an operating system and at least one application program. The operating system is a set of software which controls the computer system's operation and the allocation of resources. The application program is a set of software that performs a task desired by the user, making use of computer resources made available through the operating system. Both are resident in the illustrated memory system 16.

In accordance with the practices of persons skilled in the art of computer programming, the present invention is described below with reference to symbolic representations of operations that are performed by computer system 10, unless indicated otherwise. Such operations are sometimes referred to as being computer-executed. It will be appreciated that the operations which are symbolically represented include the manipulation by CPU 14 of electrical signals representing data bits and the maintenance of data bits at memory locations in memory system 16, as well as other processing of signals. The memory locations where data bits are maintained are physical locations that have particular electrical, magnetic, optical, or organic properties corresponding to the data bits.

Figure 2:
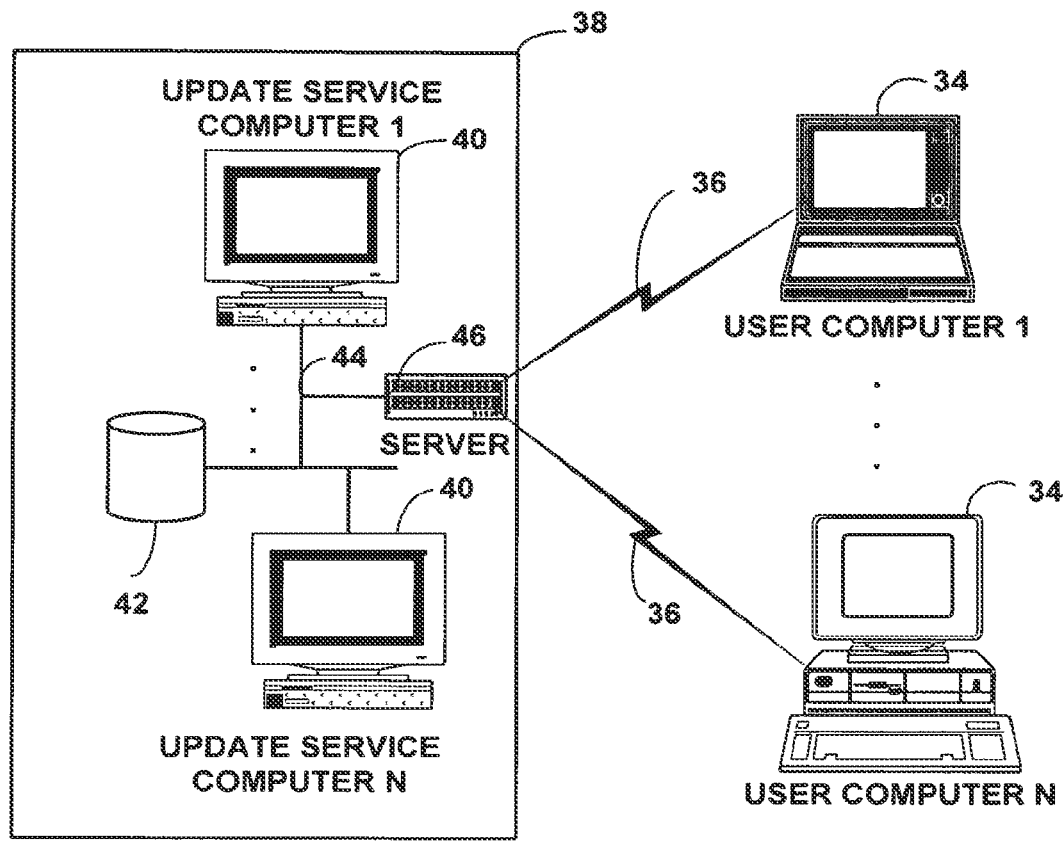
FIG. 2 is a block diagram showing the update service center and the remote user computers.

As is shown in FIG. 2, the illustrated embodiment of the invention consists of one or more user computers 34 which are connected over communications links 36 to an update service center 38. The update service center consists of one or more second remote computer(s) 40, one or more communications links 36, and one or more databases 42.

The update service center 38 consists of one or more computers 40 (e.g. the computer that was described in FIG. 1) which are capable of simultaneous access by a plurality of user computers. If a plurality of update service computers are used, then the update service computers may be connected by a local area network (LAN) 44 or any other similar connection technology. However, it is also possible for an update service center to have other configurations. For example, a smaller number of larger computers (i.e. a few mainframe, mini, etc, computers) with a number of internal programs or processes running on the larger computers capable of establishing communications links to the user computers. The update service center may also be connected to a remote network (e.g. the Internet) or a remote site (e.g. a satellite) (which is not shown in FIG. 2). The remote network or remote site allows the update service center to provide a wider variety of computer software than could be stored at the update service center. One or more databases 42 connected to the update center computer(s) 40 are used to store database entries consisting of computer software available on the update service computer(s). The update service computer(s) also contain a plurality of communications links 36 such as telecommunications connections (e.g. modem connections, ISDN connections, ATM connection, frame relay connections, etc.), network connections (e.g. Internet, etc.), satellite connections (e.g. Digital Satellite Services, etc.), wireless connections, two way paging connections, etc., to allow one or more user computers to simultaneously connect to the update service computer(s). The connections are managed by an update server 46.

After a user computer establishes two-way communications with the update service computer, an inventory of computer software on the user computer is completed without interaction from the user, sent to the update service computer, and compared to database entries on the update service computer. The database entries from the database connected to the update service computer contain information about computer software which is available to a user. After the comparison, the user computer is sent back a summary of available computer software which is displayed for the user. The summary contains infatuation such as the availability of patches and fixes for existing computer software, new versions of existing computer software, and brand new computer software, new help files, etc. The user is then able to make one or more choices from the summary of available computer software, and have the computer software transferred from the update service computer to the user computer. The user may choose to update on the fly, or store update information for future update needs.

Figure 3:
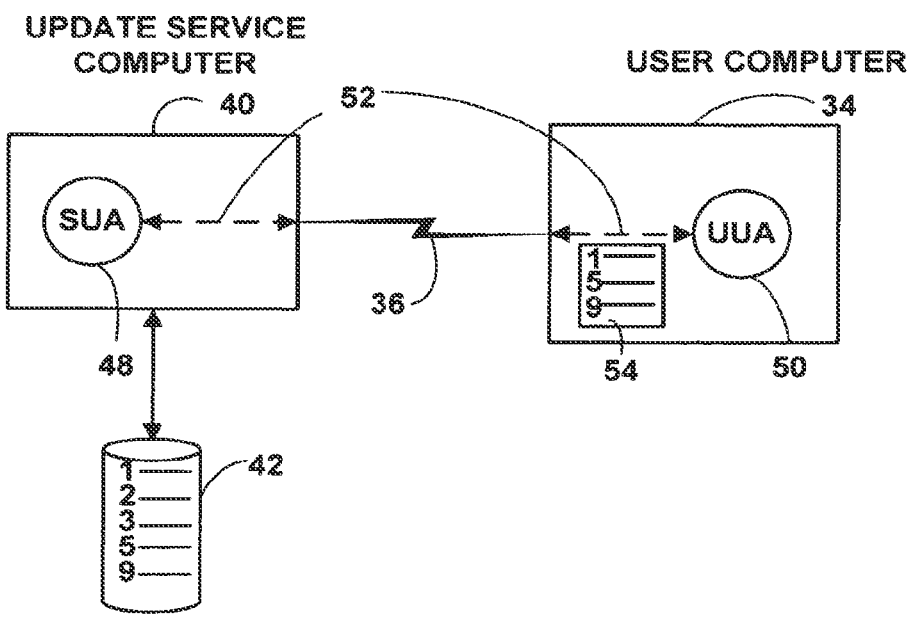
FIG. 3 is a block diagram showing the access processes on the user and update service computers.

As is shown in FIG. 3, running on the update service computer(s) 40 is one or more service update applications (SUA) 48 that will communicate with a user update application (UUA) 50 on the user computer when the update service is contacted by the a user with a user computer. The user update application 50 is a computer software program that is capable of initiating, establishing and terminating two-way communications with an update service application on the update service computer. The service update application 48 is a computer software program which is also capable of initiating, establishing and terminating two-way communications with a user update application on a user computer.

To access the update service center 38, a user starts a user update application (UUA) 50 on the user computer 34 to begin the access process. The user update application 50 tries to establish a two-way communications link 36 with an update service computer 40 using a modem, a network connection (e.g. Internet), etc. However, this access can also be completed by a variety of other methods which provide two-way data transfer. As the user update application 48 on the user computer 34 tries to establish a two-way communications link 36 to the update service computer 40, the update service computer starts a service update application (SUA) 48. The service update application on the update service computer then tries to establish a two-way communications link to the user update application on the user computer. This is shown by the dashed lines 52 in FIG. 3. This communications link can be established with a network protocol stack, (e.g. TCP/IP) through sockets, or any other two-way communications technique known in the art.

After establishing a two-way communications link, the service update application conducts an automatic inventory (i.e. without input from the user) of the computer software on the user computer. The data collected during the inventory is sent from the user computer to the remote update service computer. The service update application on the update service computer compares the inventory data collected from the user computer to data stored in a database on the update service computer. The database contains information on available computer software available from the update service. The update service computer then creates a summary and sends the summary to the user computer. The summary 54 is then presented to the user by the user computer. The summary contains information about computer software available on the update service computer such as the availability of patches and fixes for existing computer software, new versions of existing computer software, and brand new computer software, etc. In addition, the availability of agent help files, wizards, inference engines, and other operating system components will be listed in the summary.

The illustrated embodiment of the invention is implemented in the Microsoft Windows 95 operating system by the Microsoft Corporation of Redmond, Washington using a modem, or an Internet network connection, for access to the update service computer. The invention can likewise be practiced with other operating systems and other access technologies that allow two-way data transfer.

Figure 4B:
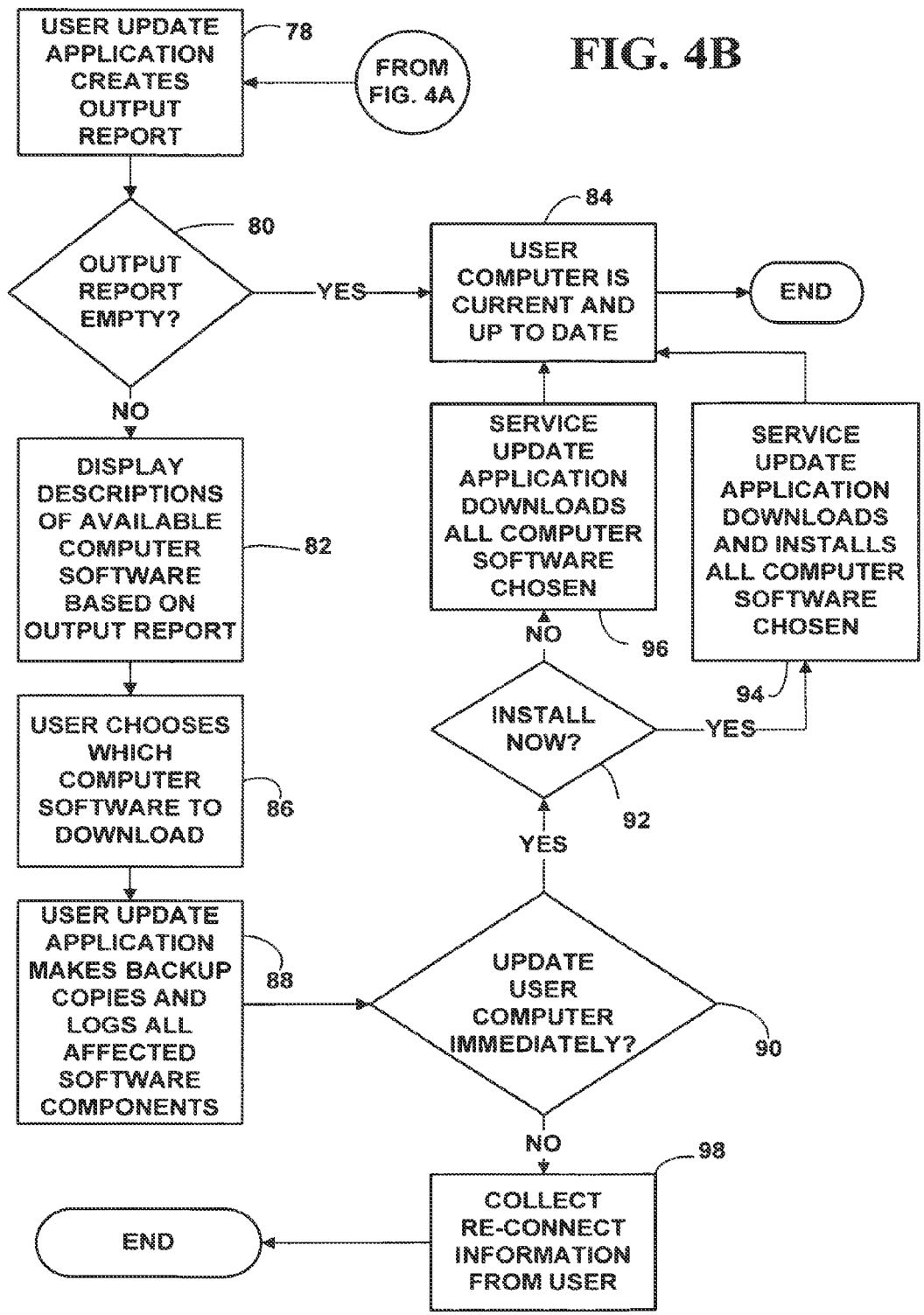

As is shown in the flowchart in FIG. 4A, a user begins the access sequence (56) to an update service by launching a user update application included in the Windows 95 operating system. However, the user update application can also be any application that is capable of two-way communications, and run under other operating systems. The user update application allows the user computer to establish a two-way communications path for access to the update service computer.

When the user update application starts (58), the user is shown optional help information which instructs the user on how to establish a connection between the user computer and the update service computer. The actual connection configuration is completed by allowing a user to choose the appropriate connection method (60). For example, the user may choose to establish the connection with a modem. If a modem is chosen, the phone number to dial, modem (e.g. speed, line type, etc.) and communications parameters (e.g. parity, stop bits, etc.) are then configured. If the user chooses to make a network connection (e.g. Internet, etc.) to access the update service, the network address of the update service and other network parameters are configured. A similar sequence would be completed for other connection technologies.

When the user update application attempts to make the desired connection (60), the update service computer launches a service update application (64). A two-way communications path (66) is set up between the service update application on the update service computer and the user update application on the user computer. The service update application on the update service computer then requests that the user update application on the user computer conduct an automatic inventory of all computer software installed (68) on the user computer.

In the illustrated system, this inventory is done automatically (i.e. without input from the user), and is completed by assigning the inventory task to a Windows 95 operating system process thread on the user computer. The operating system thread completes the task in the "background" while the user is performing other activities in the "foreground" (e.g. choosing options from the user update application). In reality, there are no real background and foreground processes, just a number of operation system process and process threads which are run for some specified time interval by the operating system. Threads are well known in the art and are used in other operating systems such as Windows NT by Microsoft, and OS/2 by IBM. However, other operating system techniques could also be used to accomplish the inventory on the user computer.

During the inventory, data is collected about all computer software installed on the user computer. Data such as the software title, date, version, file size, file checksum, directory location on the user computer, etc. are collected. After the inventory is complete, the user update application sends (70) the inventory data from the user computer to the service update application on the update service computer. The service update application compares the user inventory data from the user computer to database entries in the computer software database to automatically analyze the computer software stored on the user computer (72). The database connected to the update service computer has entries which contain information about available computer software. The database entries also identify and describe, for example, components of the computer software, including new computer software, patches, fixes, new help files, wizards, inference engines, other operating system components, updates as well as enhancements and new features of existing computer software. The database entries describing new computer software may also include entries describing brand new computer software (i.e. computer software that is newly created, and not previously existing).

Any computer software installed on the user computer which is listed in the database on the update service computer (e.g. out-of-date and/or require a maintenance update, etc.) is flagged as available (74). The user computer may also contain computer software that is not known by the update service. If the user computer contains computer software which is unknown to the update service computer, this computer software is marked as unknown by the update service computer. After the service update application completes the analysis of user computer software, a summary report is sent back to the user computer from the update service computer (76).

In the illustrated system, the user can choose from several update service options. One option may be to check for maintenance updates for all computer software installed on the user computer that is known by the update service. A second option may be to check only specific computer software, or a specific group of computer software stored on the user computer for maintenance updates. For example, if the user wanted to check and see if there were any maintenance updates for a particular word processing program, option two would be selected. A third option may be to check whether there are any new or enhanced versions of computer software available from the update service. A fourth option may be to check only for new versions of specific computer software or groupings of computer software installed on the user computer. A fifth option may be to check the update service computer for information on new computer software (i.e. brand new products, not new or enhanced versions of existing products). A sixth option may be to check only if there are new help files, or other new support data available. This list of options is not intended to be all inclusive, as other options can be added to provide additional update service functionality. Based on user input, the user update application creates an output report (78) (FIG. 4B) based on the option(s) chosen by the user and the summary report created by the service update application. The service update application can also create the output report directly, using default choices with no input at all from a user.

If the output report is not empty (80), a second optional report is created and displayed for the user providing a short description that summarizes the computer software available from the update service (82). This second optional report is used by the user to determine what computer software on the user computer will be updated, if any. If the output report is empty, the computer software on the user computer is current and up-to-date (84), so no further action by either the update service computer or the user computer is required.

If the output report is not empty, then the user is asked to choose which available computer software shown in the output report, if any, will be downloaded and installed on the user computer (86). No software is downloaded without the user's permission. If one or more computer software components (i.e. pieces or parts of the available computer software) are chosen by the user, the user update application is instructed to make backup copies of all of the computer software components on the user computer that will be affected, and create a log for the user documenting which computer software will be replaced (88). The backup copies and the log can be used by the user to restore the original version of the computer software components on the user computer if a need arises to do so.

The user has the option of choosing none, one, or a number of computer software components to download and install. If the list of available computer software to be downloaded and installed is large, the user also has the option of delaying the update to a later time (90). If the user chooses an immediate download, the user is asked if the service update center should also install the computer software chosen by the user (92) after downloading.

If immediate installation is chosen, the service update application on the update service computer downloads the available software to the user computer and installs the software in the proper place (e.g. in the proper directory or subdirectory) on the user computer (94). A log is also created that records what computer software was downloaded to the user computer. If immediate installation is not chosen by the user, the user can save any update information, and continue with other tasks before deciding when to download any software chosen by the user.

If the user chooses a delayed update, the user provides re-connect information (98) that allows the update service computer to re-connect to the user computer at a more convenient time (e.g. midnight, etc.) and complete the downloading and installation at that time.

As part of the re-connect information, the user may create a logon script using an automated macro language to provide the logon sequence to be used, and the directory to be used to download the software chosen by the user. The logon script and the time the user wishes to have the chosen software downloaded are then sent to the update service computer, and stored in an update service computer database. At the appropriate time chosen by the user, the update service will execute the logon script to re-connect to the user computer, and download the chosen software in the proper directory. An encryption scheme may also be used to permit safe transfer of the software to the user computer.

The user also has the option of choosing a logon method different then the one they are currently connected to the update service center with. For example, if a user is connected to the update service center with a modem, the user may choose to have the chosen software downloaded at a later time using a network connection (e.g. Internet, etc.). However, the user's computer must be capable of accepting software with a different connection method.

To allow a re-connection using a modem, the user would enter the phone number of the phone line attached to the user computer and send this information to the update service computer. The user would leave the user computer and modem on, and set the communications software in an answer mode to answer any incoming calls. For a network re-connection, the user would provide the update service computer the user network address and set the network software in a host mode to process any network connection attempts.

Figure 5:
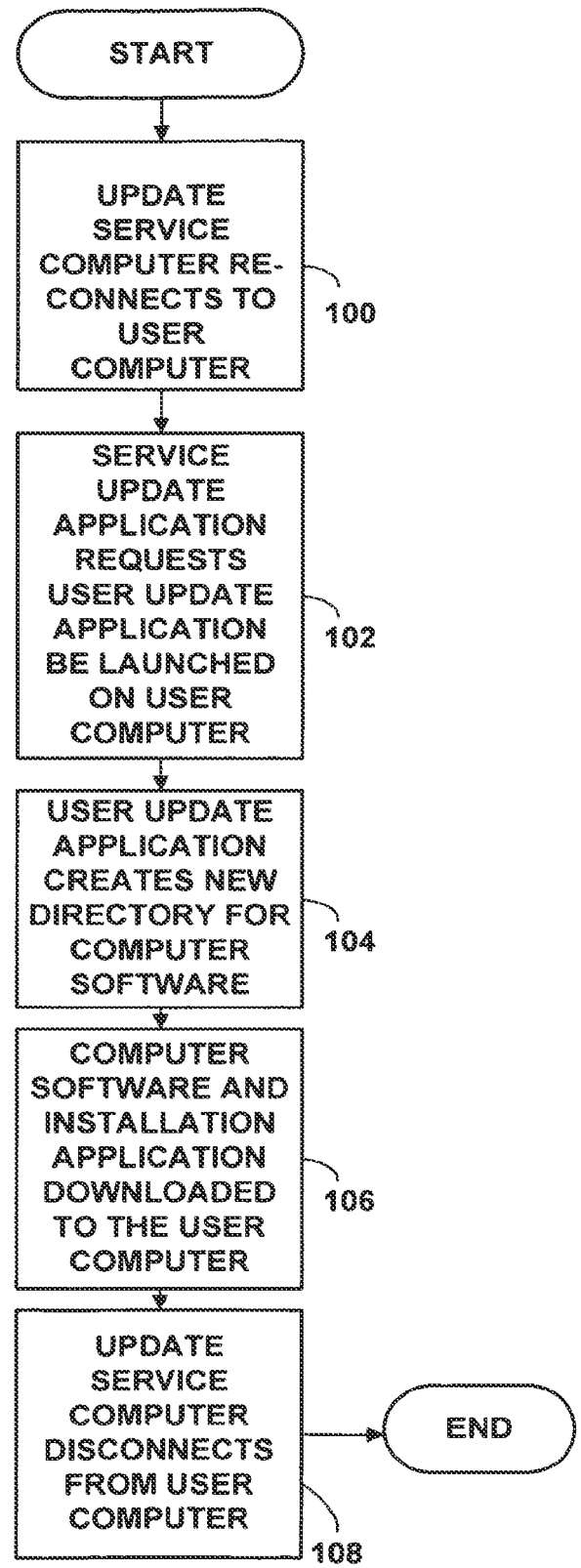
FIG. 5 is a flow chart showing an illustrative sequence followed when the update service re-connects to a user computer.

The delayed downloading is illustrated in the flow chart in FIG. 5. To complete the delayed downloading, the update service computer launches a service update application that tries to re-connect (100) to the user computer. The update service application will use the information provided at an earlier time by a user (e.g. modem logon information, network logon information, a logon script, etc.). If the connection is successful, a service update application on the update service computer asks the user computer to launch a user update application to re-establish a two-way communications path (102). The re-connect to the user computer may be completed using a different access method than was used during the original user computer-update service computer connection. For example, the update service computer may request a digital satellite system re-connect to the user computer instead of the update service computer. A different access method is typically chosen to provide the most efficient and greatest bandwidth data transfer between the update service computer and the user computer.

After establishing a new two-way communications path, the user update application creates a new directory (104) on the user computer, where the computer software is transferred and stored (106). A log is also created to document what available computer software was transferred to the user computer. Included with the downloaded computer software is an installation application that will be used later by the user to install the computer software. When the transfers are complete, the update service computer terminates the connection to the user computer (108). An encryption scheme may also be used to permit safe automated transfer of the software to the user computer.

When the user is ready to install the computer software (e.g. the next morning if the computer software was transferred and installed in the middle of the night), the user simply launches the installation application supplied by update service computer.

Leaving the user an installation application to execute is an added safety and security measure for both the user and the update service. The user computer is not updated unless the user personally starts the installation process. However, the user can also choose to have the computer software automatically installed by the update service when it re-connects to the user computer (but, user permission is always obtained and recorded first). In this case, the installation application is not downloaded to the user computer. However, a log is created so a user can determine what available computer software was downloaded and installed.

As was described above, the third, fourth, and fifth options allow a user to check for new versions of existing computer software, or new computer software available from the update service. If a new version of existing computer software, or new computer software is available, the user is asked if she wishes to purchase the computer software. If so, the appropriate fee is requested from the user. The user can pay the fee electronically by transmitting credit card information, debit card information, billing account information, etc. to the update service computer from the user computer. Digital signatures, secure transaction technology, or an encryption scheme may also be used to collect payment information from the user. Once the fee information is collected by the update service computer and is verified, the user can choose between immediate or delayed downloading of the new, or new version of the computer software following steps (88-98) (FIG. 4B) described above.

Since new versions of computer software are typically very large, the user will be informed that a delayed installation is probably most efficient for the user. If a delayed installation of a new product is chosen, the update service computer will then re-connect to the user computer at a later time and download the new version of the computer software as was shown in FIG. 5. In the illustrated embodiment, the update service uses a digital satellite service link, or some other higher bandwidth connection to transfer the computer software to the user computer whenever possible.

If the user chooses not to pay for a new version of computer software when the update service is called, additional data from which the user can obtain more information on the new computer software is displayed. For example, the information may contain a summary of the features of the new computer software and the information may also contain a list of retail outlets close to the user where the user may then purchase a new version of computer software on storage media if desired. Some users may prefer to obtain the computer software on storage media and call the update service to obtain up-to-date versions of the computer software.

With automatic downloading and installation of computer software from the update service, the user is relieved from the burden of obtaining computer software (e.g. on storage media, by downloading from a bulletin board or on-line service, etc.), and installing the computer software on the user computer. Once a user purchases computer software, periodic calls to the update service will keep the user current and up-to-date.

It should be understood that the programs, processes, or methods described herein are not related or limited to any particular type of computer apparatus, unless indicated otherwise. Various types of general purpose or specialized computer apparatus may be used with or perform operations in accordance with the teachings described herein.

Having illustrated and described the principles of the present invention in an illustrated embodiment, it should be apparent to those skilled in the art that the embodiment can be modified in arrangement and detail without departing from such principles. For example, elements of the illustrated embodiment shown in software may be implemented in hardware and vice versa. Similarly, hardware and software components can be interchanged with other components providing the same functionality.

In view of the wide variety of embodiments to which the principles of this invention can be applied, it should be understood that the illustrated embodiments are exemplary only, and should not be taken as limiting the scope of my invention. Rather, I claim as my invention all such embodiments as come within the scope and spirit of the following claims and equivalents thereto.

I claim:

1. A computer readable storage device storing computer executable instructions that when executed by a processor perform a method, the method comprising:
    establishing, by a first computing device, a communication with a second computing device over a network;
    determining whether computer software installed on the first computing device has an available update for installation on the first computing device;
    responsive to determining that computer software installed on the first computing device has an available update for installation on the first computing device, presenting a list at the first computing device displaying the computer software installed on the first computing device that has the available update for installation on the first computing device; and
    in response to a received selection on the first computing device, downloading and installing the available update on the first computing device.

2. The computer readable storage device of claim 1, wherein the list is limited by one or more categories selected by a user at the first computing device.

3. A computer readable storage device storing computer executable instructions that when executed by a processor perform a method, the method comprising:
    determining whether computer software is available for installation on a computing device over the network;
    responsive to determining that computer software is available for installation on the computing device, presenting a list displaying computer software not installed on the computing device and available for installation on the computing device;
    receiving a selection at the computing device indicating computer software to be downloaded to the computing device; and
    downloading the computer software to the computing device.

4. The computer readable storage device of claim 3, wherein the list is limited by one or more pre-selected categories.

5. The computer readable storage device of claim 3, wherein the computer software available for installation on the computing device comprises at least one software upgrade, wherein the software upgrade upgrades computer software already installed on the computing device.

6. The computer readable storage device of claim 3, wherein the computer software not installed on the computing device and available for installation on the computing device comprises new software.

7. A computer readable storage device storing computer executable instructions that when executed by a processor perform a method, the method comprising:
    determining from one or more communications over the network, whether computer software is available for installation on a computing device but not installed on the computing device;
    responsive to determining that computer software is available but not installed on the computing device, presenting a list displaying the computer software available but not installed on the computing device;
    receiving a selection indicating computer software to be downloaded and installed on the computing device; and
    in response to the selection, downloading and installing the computer software on the computing device.

8. The computer readable storage device of claim 7, wherein the list is limited by one or more pre-selected categories.

9. The computer readable storage device of claim 7, wherein the computer software available for installation on the computing device comprises at least one software upgrade, wherein the software upgrade upgrades computer software already installed on the computing device.

10. The computer readable storage device of claim 7, wherein the computer software available for installation on the computing device comprises new software.

11. A computer readable storage device storing computer executable instructions that when executed by a processor perform a method, the method comprising:
    determining whether software is available over a network for installation at a computing device but not installed on the computing device;
    as a result of the determining, presenting a user interface on a display of the computing device, wherein the user interface is operable to accept user input to initiate acquisition of the software that is available for installation on the computing device; and
    responsive to receiving user input, acquiring the software over the network.

12. The computer readable storage device of claim 11, wherein the software that is available for installation at the computing device comprises at least one software upgrade, wherein the software upgrade upgrades software already installed on the computing device.

13. The computer readable storage device of claim 12, further comprising automatically installing the software.

14. The computer readable storage device of claim 12, wherein the software that is available for installation at the computing device comprises new software.

15. A computer-implemented method of acquiring computer software for a computing device over a network, the method comprising:
    determining whether computer software is available for download over the network but not installed on the computing device;
    acquiring permission at the computing device to download the computer software that is available; and
    responsive to receiving permission, downloading the computer software available for download.

16. The method of claim 15, wherein the computer software available for download comprises at least one computer software upgrade, wherein the computer software upgrade upgrades computer software already installed on the computer.

17. The method of claim 15, wherein the computer software available for download but not installed comprises new computer software.

18. The medium method of claim 15, wherein the computer software available for download comprises computer software to correct corrupted computer software on the computing device.

19. The method of claim 15, wherein the computer software is downloaded to the computing device with a digital signature over a public network.

20. The method of claim 15, further comprising installing the computer software available for download on the computing device.

* * * * *